(12) United States Patent
Sulzer et al.

(10) Patent No.: US 11,781,891 B2
(45) Date of Patent: Oct. 10, 2023

(54) MAGNETIC-INDUCTIVE FLOWMETER HAVING AN INTERNAL CONDUCTIVE COATING

(71) Applicant: Endress+Hauser Flowtec AG, Reinach (CH)

(72) Inventors: Thomas Sulzer, Basel (CH); Simon Mariager, Basel (CH); Simon Triebenbacher, Basel (CH); Michael Fuchs, Eschbach (DE)

(73) Assignee: Endress+Hauser Flowtec AG, Reinach (CH)

( * ) Notice: Subject to any disclaimer, the term of this patent is extended or adjusted under 35 U.S.C. 154(b) by 284 days.

(21) Appl. No.: 17/256,298

(22) PCT Filed: May 23, 2019

(86) PCT No.: PCT/EP2019/063413
§ 371 (c)(1),
(2) Date: Dec. 28, 2020

(87) PCT Pub. No.: WO2020/001877
PCT Pub. Date: Jan. 2, 2020

(65) Prior Publication Data
US 2021/0131843 A1    May 6, 2021

(30) Foreign Application Priority Data
Jun. 28, 2018 (DE) ...................... 10 2018 115 629.4

(51) Int. Cl.
*G01F 1/58* (2006.01)
*G01F 15/14* (2006.01)

(52) U.S. Cl.
CPC .............. *G01F 1/588* (2013.01); *G01F 15/14* (2013.01)

(58) Field of Classification Search
None
See application file for complete search history.

(56) References Cited

U.S. PATENT DOCUMENTS

| | | | |
|---|---|---|---|
| 4,499,754 A | 2/1985 | Akano et al. | |
| 4,507,975 A | 4/1985 | Bittner et al. | |
| 5,280,727 A | 1/1994 | Hafner et al. | |
| 7,437,945 B1 | 10/2008 | Feller | |
| 2010/0037702 A1* | 2/2010 | Rackebrandt | G01F 1/584 73/861.12 |
| 2012/0017698 A1* | 1/2012 | Neuburger | G01F 1/58 73/861.12 |

(Continued)

FOREIGN PATENT DOCUMENTS

| | | |
|---|---|---|
| CN | 101900583 A | 12/2010 |
| CN | 102297711 A | 12/2011 |
| DE | 102004062680 A1 | 6/2006 |

(Continued)

*Primary Examiner* — Harshad R Patel
(74) *Attorney, Agent, or Firm* — Christopher R. Powers; Endress+Hauser (USA) Holding, Inc.

(57) ABSTRACT

A magnetic-inductive flowmeter includes a measuring tube for conveying a medium, a magnetic field generating coil and at least two measuring electrodes for sensing a measurement voltage inductively generated in the medium, including a conductive coating internally selectively applied in the measuring tube for forming a galvanic contacting of the medium.

12 Claims, 4 Drawing Sheets

(56) References Cited

U.S. PATENT DOCUMENTS

2012/0304780 A1\* 12/2012 Walbrecker ............... G01F 1/58
　　　　　　　　　　　　　　　　　　　　　　73/861.12

FOREIGN PATENT DOCUMENTS

| | | |
|---|---|---|
| DE | 102005044677 A1 | 3/2007 |
| DE | 202005021186 U1 | 6/2007 |
| DE | 59914903 D1 | 12/2008 |
| DE | 102009002053 A1 | 10/2010 |
| EP | 1186867 B1 | 11/2006 |
| GB | 726271 | 3/1955 |
| GB | 2403016 A | 12/2004 |
| JP | 1140022 A | 6/1989 |
| JP | 6117892 A | 4/1994 |
| JP | 3177011 B2 | 6/2001 |
| RU | 2044415 C1 | 9/1995 |

\* cited by examiner

PRIOR ART  Fig. 1

MAGNETIC-INDUCTIVE FLOWMETER HAVING AN INTERNAL CONDUCTIVE COATING

CROSS-REFERENCE TO RELATED APPLICATIONS

The present application is related to and claims the priority benefit of German Patent Application No. 10 2018 115 629.4, filed on Jun. 28, 2018, and International Patent Application No. PCT/EP2019/063413, filed on May 23, 2019, the entire contents of which are incorporated herein by reference.

TECHNICAL FIELD

The present disclosure relates generally to magnetic-inductive flowmeters and methods of manufacturing the same, particularly magnetic-inductive flowmeters including a selective conductive coating.

BACKGROUND

Magnetic-inductive flowmeters are applied for determining flow velocity and volume flow of a medium in a measuring tube. A magnetic-inductive flowmeter includes a magnetic field generating means, which generates a magnetic field extending perpendicularly to the transverse axis of the measuring tube. Usually one or more coils are used for such purpose. In order to implement a predominantly uniform magnetic field, supplementally, pole shoes are so formed and placed that the magnetic field lines extend essentially perpendicularly to the transverse axis over the total tube cross section. A measuring electrode pair applied diametrically on the lateral surface of the tube senses an inductively generated, electrical measurement voltage, which arises, when a conductive medium flows in the direction of the longitudinal axis in the presence of applied magnetic field. Since the sensed measurement voltage depends according to Faraday's law of induction on the velocity of the flowing medium, flow velocity can be ascertained from the measurement voltage and, with incorporation of a known tube cross section, volume flow of the medium.

In the case of conductive tubes, insulation measures are required. Thus, the inner walls are usually lined with a liner or coated with an insulating plastic. For grounding the medium flowing through the measuring tube, grounding gaskets are placed terminally on the measuring tube. An insufficient grounding can lead to measurement errors and to destruction of the measuring electrodes.

EP 1186867 B1 discloses grounding gaskets, which are clamped between terminal flanges of a magnetic-inductive flowmeter and flanges of the pipelines.

Known from DE 102009002053 A1 is a magnetic-inductive flowmeter, in the case of which the grounding is implemented by a flange plate coated with an electrically conductive material.

DE 102005044677 A1 discloses a magnetic-inductive flowmeter having a ring formed of an electrically conductive plastic. The ring is formed as one piece on the insulating inner layer of the measuring tube and serves as a seal and grounding gasket.

Known from U.S. Pat. No. 4,507,975 is a magnetic-inductive flowmeter having a ceramic measuring tube, which has internal grounding electrodes, which are implemented by means of applying and heat treating a platinum paste.

Disadvantageous with these proposals, however, is that large grounding gaskets are, on the one hand, expensive, and, on the other hand, they can lead to damage of the measuring tube coating. Furthermore, known methods for applying grounding electrodes in the measuring tube are associated with high temperatures, which can damage the measuring tube and/or the insulating coating.

SUMMARY

Starting from the above described state of the art, an object of the present disclosure is to provide a magnetic-inductive flowmeter, which has grounding electrodes, which are applied by a coating method cost effectively and protecting the interior of the measuring tube.

A magnetic-inductive flowmeter of the invention includes a measuring tube for conveying a medium, a magnetic field generating means and at least two measuring electrodes for sensing a measurement voltage inductively generated in the medium and is characterized by a conductive coating selectively applied internally in the measuring tube for forming a galvanic contacting of the medium.

By selectively applying the conductive coating in the measuring tube interior, the need for large grounding gaskets can be avoided. By means of the selectively applied coating, the pipeline and the medium can be brought to the same potential, this being especially necessary, when the measuring tube has an internal, insulating coating or a liner. Because the conductive coating is wettable by the medium, either a potential present in the medium, e.g., a reference potential, can be measured or a potential of the medium can be made the same as a reference potential, e.g., a ground potential or earth potential. By replacing the large grounding gasket with a thin, selectively applied coating, a grounding of the medium can be implemented with small amounts of electrode material. Furthermore, the orienting and the locking of the grounding gasket in place can be avoided.

Advantageous embodiments of the invention are set forth in the dependent claims.

In an embodiment, the conductive coating comprises a conductive polymer and/or a metal and/or a conductive paint system and/or a conductive powder coating.

Used as electrode materials are e.g., stainless steels, CrNi alloys, ZnAl alloys, platinum or titanium. Suited for applications are, for example, the stainless steels 1.4435 and 1.4462.

In an embodiment, the conductive coating is embodied with ring shape, wherein the conductive coating has a ring thickness d and a ring breadth b.

Ring-shaped grounding electrodes applied in the interior of the measuring tube, which serve for grounding of the flowing medium, require no external connection with a ground, or earth, potential. Thus, a contacting of an external ground by means of a cable can be avoided, and this leads to a reduction of possible disturbance sources and simplifies manufacture. Necessary for a sufficient grounding are grounding electrodes having a minimum ring breadth b of greater than or equal to 2 cm for measuring tubes having a nominal diameter D greater than or equal to 300 mm.

In an embodiment, the conductive coating is applied selectively on the inlet and outlet of the measuring tube.

The invention is, however, not limited to single rings on the ends of a measuring tube. The grounding electrodes can have any structure and also be formed of a number of independent structures. For example, a plurality of rings can be used, which are applied at fixed or variable distances from one another.

In an embodiment, $b \geq c \cdot D^2/l$ for a measuring tube having a length l and a nominal diameter D with $D \geq DN300$, wherein $0.05 \leq c \leq 0.25$ and preferably $0.10 \leq c \leq 0.20$.

The parameter c depends on the construction of the magnet system. Typical values for c lie between 0.05 and 0.25. For measuring tubes with a large nominal diameter, usually $l \approx D$, such that the inequality can be simplified to $b \geq c \cdot l$.

In an embodiment, the conductive coating has a conductivity $S_1$, wherein $S_1 \geq 10^6$ S/m, for example, $S_1 \geq 5 \cdot 10^6$ S/m and, for example, $S_1 \geq 1 \cdot 10^7$ S/m.

Advantageously, the conductivity of the conductive coating $S_1$ is at least 1000 times as large as a conductivity of the medium $S_2$, for example, 2000 times as large and, for example, 5000 times as large. This minimum requirement is especially necessary for conductive coatings of conductive polymers, since these usually have a conductivity, which is less than $10^6$ S/m.

In an embodiment, the measuring tube comprises a conductive tube having an electrically insulating liner or an insulating coating.

Advantageously, the tube is a metal tube, for example, a steel tube.

Advantageously, the insulating coating or the liner material comprises an unsaturated polyester resin, polyester resin, epoxide resin, vinyl ester resin, natural rubber, polyurethane, preferably a drinking water suitable polyurethane, a soft rubber, a hard rubber and/or a fluorine containing plastic, such as e.g. PFA or PTFE. These materials possess, on the one hand, good mechanical strength, as well as also, on the other hand, good diffusion resistance for preventing diffusion related undercutting of the liner by the medium or swelling of the liner material and therewith a narrowing of the tube cross-section. The liner can, however, also comprise a composite-material, for example, a natural fiber composite material, for example, a wood-plastic-composite material or a natural fiber plastic. These composite materials, especially those with natural fiber reinforced plastic, polypropylene PP-NF, have suitable material properties for the manufacturing of measuring systems.

In an embodiment, the conductive coating is applied on the liner or the insulating coating.

In an embodiment, the conductive tube is only partially lined with the liner or the insulating coating, wherein the conductive coating is applied on the exposed region.

The selective lining of the tube with an insulating layer can be implemented, for example, by a covering of the regions to remain free of the insulating layer with adhesive film or by the introduction of shield elements. In an additional step, then the conductive coating is selectively applied on the exposed regions. In such case, the conductive coating serves supplementally as corrosion protection for preventing tube damage.

In an embodiment, the measuring tube comprises an insulating tube, for example, a glass tube or a ceramic tube or, for example, a plastic tube.

The magnetic field can pass disturbance freely through a plastic tube. Additionally, a measuring tube of plastic provides low production costs, since, among other things, working steps and material costs are saved, since the coating of a, for example, metal tube with an insulating layer or a liner is absent.

Especially in the case of tubes of insulating materials, a grounding of the medium via the tube cannot occur. With the solution of the invention, the grounding electrode can be applied directly internally in the insulating tube. No additional large grounding gasket between the measuring tube and the pipeline is necessary, thus, also no locking means and orienting of the grounding gasket. Thus, a possible source of error in the assembly of the measuring tube is avoided.

In an embodiment, a flange is mounted, in each case, terminally of the measuring tube, wherein the conductive coating extends at least partially onto the flanges.

The flanges of the adjoining pipelines are connected, for example, via distance bolts with the flanges of the measuring tube, such that the flowmeter introduced between the pipelines is clamped in place. By applying the grounding electrode on the flange of the measuring tube, the contacting of the grounding electrode can be implemented via the flange, whereby the grounding cable does not have to be led into the measuring tube.

In an embodiment, the conductive coating is placed at a ground potential by means of a cable and/or a piece of sheet metal and/or by grounding the conductive tube.

A method of the invention for selectively applying a conductive coating in a measuring tube of the magnetic-inductive flowmeter of the invention by means of a rotating coating method is characterized by steps a) to g):
 a) positioning a first pouring or spray head, for example, a cold plasma-compatible spray head, in the measuring tube;
 b) rotating the measuring tube;
 c) applying the insulating coating;
 d) positioning a second pouring or spray head, for example, a cold plasma-compatible spray head, in the measuring tube;
 e) rotating the measuring tube;
 f) selectively applying the conductive coating;
 g) optionally repeating method steps a) to f).

The ribbon flow method is already used for lining tubes with an insulating coating. In such case, the insulating material is uniformly applied by means of an applicator head on the inner surface of a rotating tube. It is, consequently, advantageous to utilize this already established method for the internal application of the conductive material. This method is, however, exclusively suitable for liquid materials, such as, for example, polymers.

The cold plasma method is especially suitable when the electrode material is solid or has a high melting temperature. The cold plasma method is a surface coating method, in which the surface is exposed to a comparatively small thermal loading. Therefore, such method is suited for surface treatment of components of the most varied of materials, for example, of plastics or thin plastic coatings. With the help of a movable spray head, the electrode material can be selectively applied, such that a wide range of electrode shapes is enabled.

In an embodiment, at least one region of the tube is bounded by at least one shield element and/or covered by a film, wherein the shield element and/or the film avoid that the tube is coated in the region by the insulating coating applied in step c), wherein the shield elements and/or the film are/is removed after step c), wherein the region is filled with the conductive coating in step f).

BRIEF DESCRIPTION OF THE DRAWINGS

The invention will now be explained in greater detail based on the appended drawing, the figures of which show as follows.

DETAILED DESCRIPTION

Figure 1:
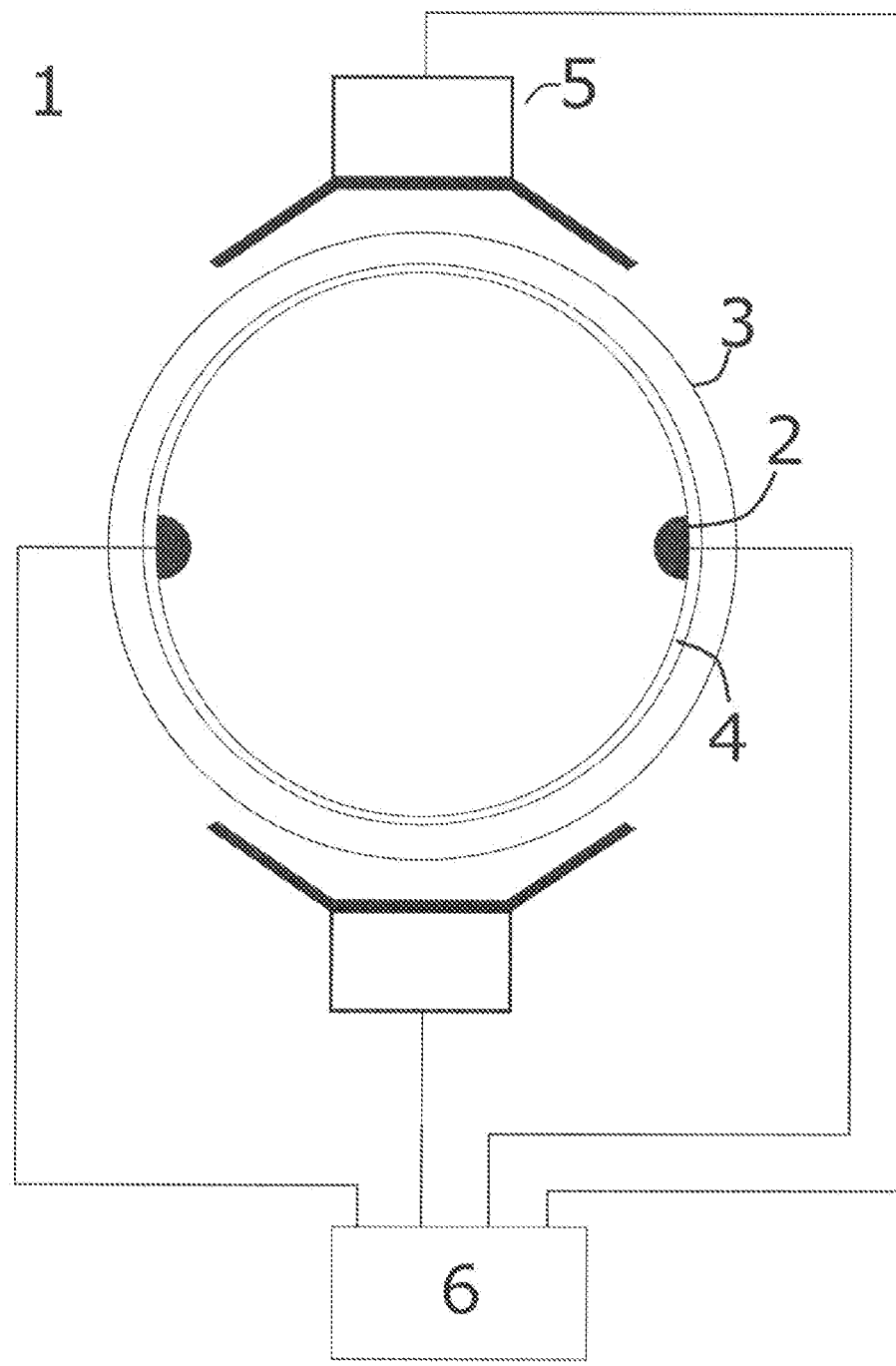
FIG. 1 shows a tube cross section of a magnetic-inductive flowmeter according to the state of the art.

The construction and measuring principle of a magnetic-inductive flowmeter is known basically. FIG. 1 shows a schematic tube cross section 1 of a known magnetic-inductive flowmeter. Conveyed through measuring tube 1 is a medium, which has an electrical conductivity. A magnetic field generating means 5 is so embodied that the magnetic field lines extend perpendicularly to a longitudinal direction defined by the measuring tube axis. The magnetic field generating means 5 is e.g., a saddle coil or a pole shoe with superimposed coil. The magnetic field formed, for example, by an electromagnet is produced by a clocked direct current of alternating polarity. This assures a stable zero-point and makes the measuring insensitive to influences of multiphase materials, inhomogeneities in the liquid or low conductivity. In the case of applied magnetic field, there arises in the measuring tube 1 a potential distribution, which is sensed with two measuring electrodes 2 on the inner wall of the measuring tube 1 and forwarded to an evaluation unit 6. As a rule, the measuring electrodes 2 are diametrically arranged and form an electrode axis, which extends perpendicularly to the magnetic field lines and to the longitudinal direction. Based on the measured measurement voltage and taking into consideration the magnetic flux density, flow velocity can be determined, and, taking into consideration the pipe cross-sectional area, volume flow of the medium can be determined. In order to avoid that the tube 3 corrupts the measurement voltage sensed by the measuring electrodes 2, the inner surface of the wall of the tube 3 is lined with an insulating material, for example, in the form of a liner 4. Terminally applied grounding gaskets serve to ground the medium flowing through the measuring tube. The grounding gaskets are usually of metal, are large and are electrically connected by means of a grounding cable to a reference potential, e.g., a ground potential or earth potential.

The solution of the invention differs from the state of the art in that the grounding electrodes are applied selectively in the measuring tube 1 and are embodied as thin coatings. Embodiments of the invention are shown in FIGS. 2 to 6.

Figure 2:
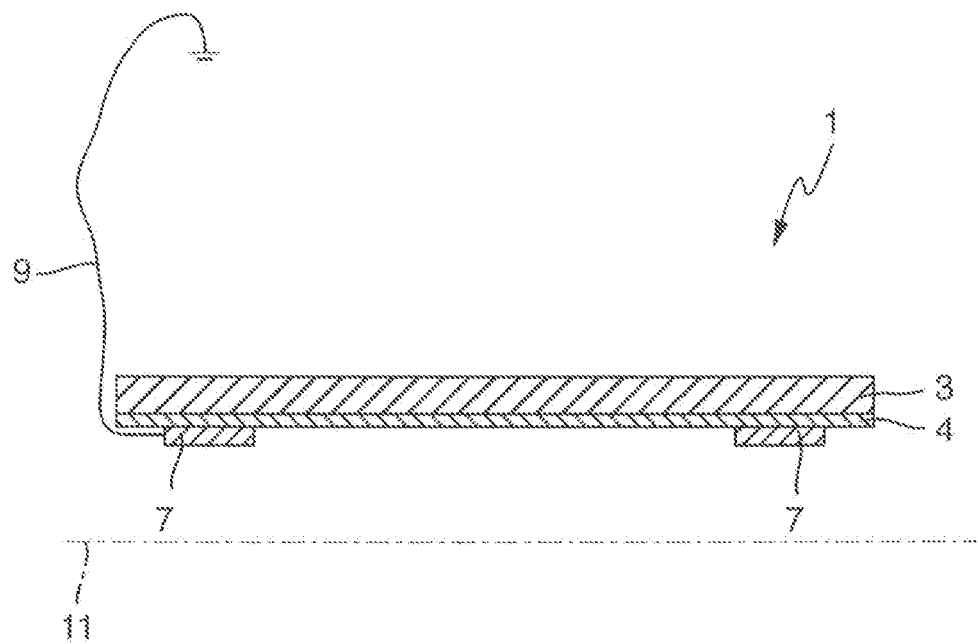
FIG. 2 shows a longitudinal section of a conductive tube, which is provided with an insulating liner, on which a conductive coating is applied as grounding electrode, wherein the coating is connected via a cable with a ground potential.

FIG. 2 shows a section of a measuring tube 1, which is rotationally symmetric about a rotational axis 11. The tube 3 is electrically conductive and lined with an electrically insulating liner 4. The grounding electrode 7 is applied in the form of a ring structure on the liner. A grounding cable 9 connects the grounding electrode with a ground, or earth, potential.

Figure 3:
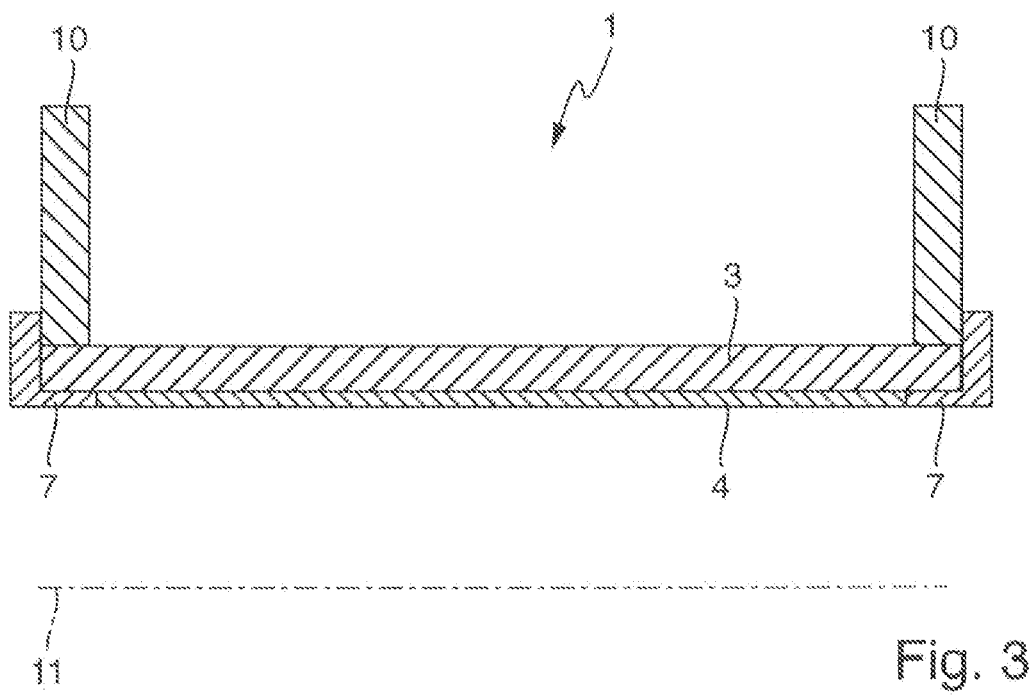
FIG. 3 shows a longitudinal section of a conductive tube, which is provided with a flange and in places with an insulating liner, wherein exposed regions are provided with a conductive coating, which extends onto the flanges.

FIG. 3 shows a section of a measuring tube 1, which is rotationally symmetric about a rotational axis 11. The tube 3 is electrically conductive and lined only in places with an electrically insulating liner 4. The selectively applied, conductive coating 7 is applied directly on exposed regions of the tube 3 and forms, thus, a direct contact to the tube 3. Furthermore, the grounding electrodes extend onto the terminally mounted flanges 10.

Advantageously, the conductive coating 7 extends onto the flanges 10. In this way, the use of a grounding cable 9 can be omitted in the case of this measuring tube 1 and the grounding of the grounding electrode 7 can occur via the flanges 10.

Figure 4:
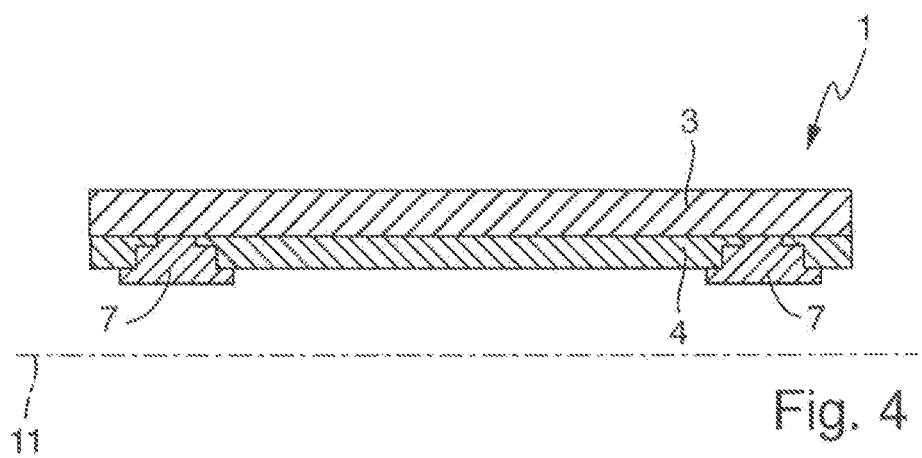
FIG. 4 shows a longitudinal section of a conductive tube, which is provided in places with an insulating liner and in other places with a conductive coating.

FIG. 4 shows a section of a measuring tube 1, which is rotationally symmetric about a rotational axis 11. Tube 3 is electrically conductive and lined partially with an electrically insulating liner 4. In such case, the liner 4 is applied in two steps, wherein regions are covered in two steps. Depending on the desired electrode form, the coating of the tube 3 with the insulating coating 4 can also comprise more than two steps. The exposed regions are then filled with the conductive electrode material in an additional step. The selectively applied conductive coating 7 lies in direct contact with the tube 3.

This embodiment does involve a plurality of steps of application, but a direct contacting of the grounding electrodes 7 with a grounding cable 9 is not necessary. The grounding electrodes 7 are in electrical contact with the potential of the tube 3. Because of this, no grounding cable 9 must be led into the measuring tube 1, whereby the installation of the measuring tube 1 in a pipeline is simplified. The grounding material serves, moreover, as corrosion protection, in order to prevent damage to the tube 3.

Figure 5:
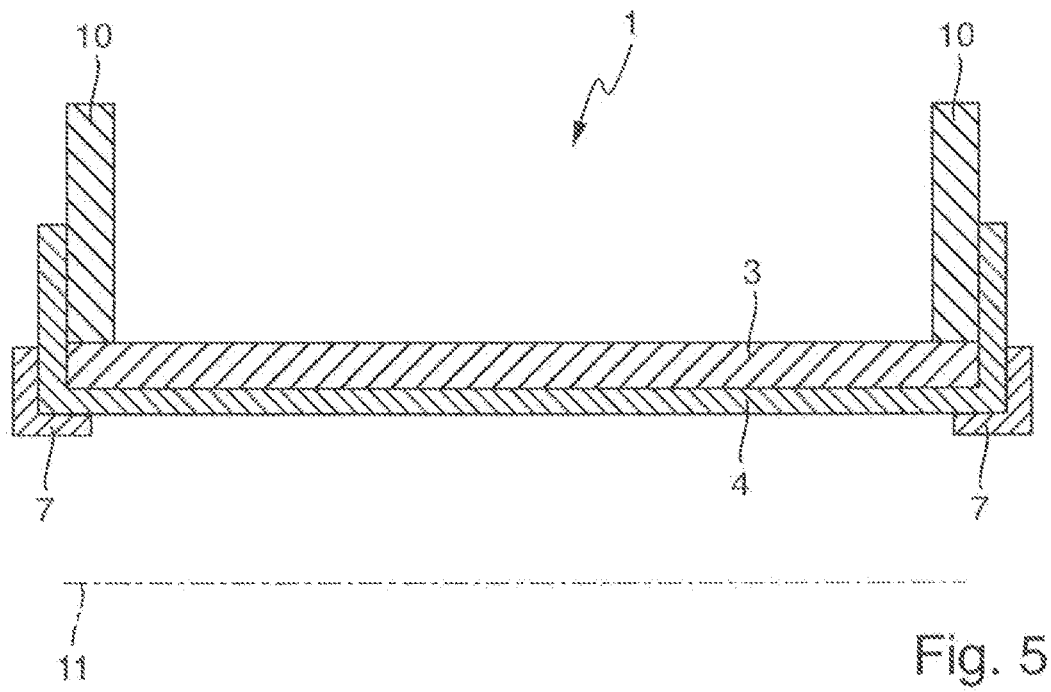
FIG. 5 shows a longitudinal section of a conductive tube, which is provided with a flange plate and an insulating liner, on which a conductive coating is applied, which extends onto the flange.

FIG. 5 shows a section of a measuring tube 1, which is rotationally symmetric about a rotational axis 11. Tube 3 is electrically conductive and lined with an electrically insulating liner 4 and has two selectively applied, grounding electrodes 7, which extend onto the terminally mounted flanges 10.

Figure 6:
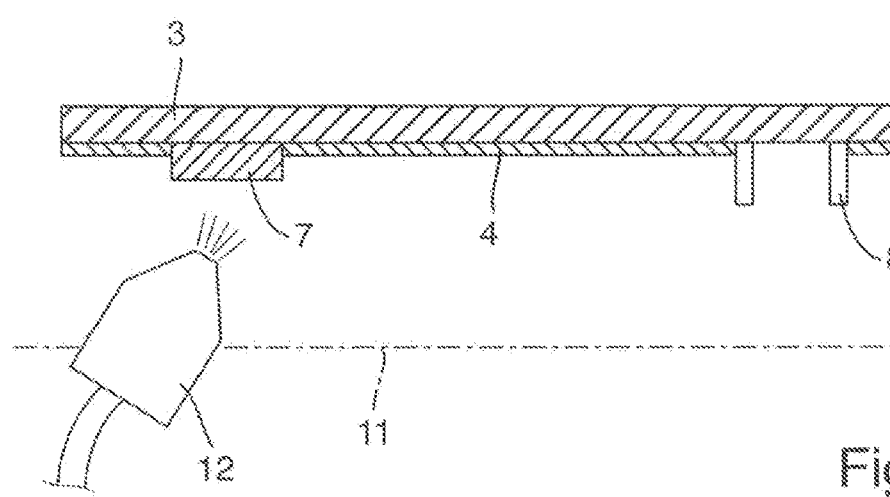
FIG. 6 shows a longitudinal section of a conductive tube, a spray head for applying electrode material and fence elements for bordering regions to remain free of electrode material.

FIG. 6 shows a section of a measuring tube 1, which is rotationally symmetric about a rotational axis 11. The measuring tube includes shield elements 8 and a spray head 12, which coats and fills exposed regions with electrode material.

In this embodiment, shield elements 8 cause the measuring tube 1 to be only partially coated with the insulating coating. The shield elements 8 are advantageous when the insulating coating 4 has a low viscosity. The shield elements 8 serve as a barrier. The locations free of insulating coating are then filled with the electrode material in an additional method step. Conductive coating 7 serves supplementally as corrosion protection for the tube 3 and can be contacted via the tube 3. In this way, a complicated contacting via a grounding cable 9 introduced into the pipe system can be avoided.

Two methods are advantageous for applying the conductive coating 7. On the one hand, the already established ribbon flow method can be used for applying the conductive coating 7, for example, when the conductive coating 7 is to be applied with ring shape, and when the electrode material is present in a liquid state and/or when an alternating of the coating method in the case of internal coating of the tube 3 is undesirable. The second method is based on a cold plasma method. With this method, metal layers can be applied on the tube 3 and/or on the liner, or the insulating coating 4, without thermally damaging them. Furthermore, by the choice of a movable spray head 12, grounding electrodes 7 of any shape can be produced. Furthermore, the cold plasma-compatible spray head 12 can be installed in an already present ribbon flow setup. Thus, the conductive coating 7 by means of the cold plasma method can be integrated without problem into the ribbon flow method-steps. However, also any other method suitable for painting or powder coating can be used for applying the conductive coating 7.

Figure 7:
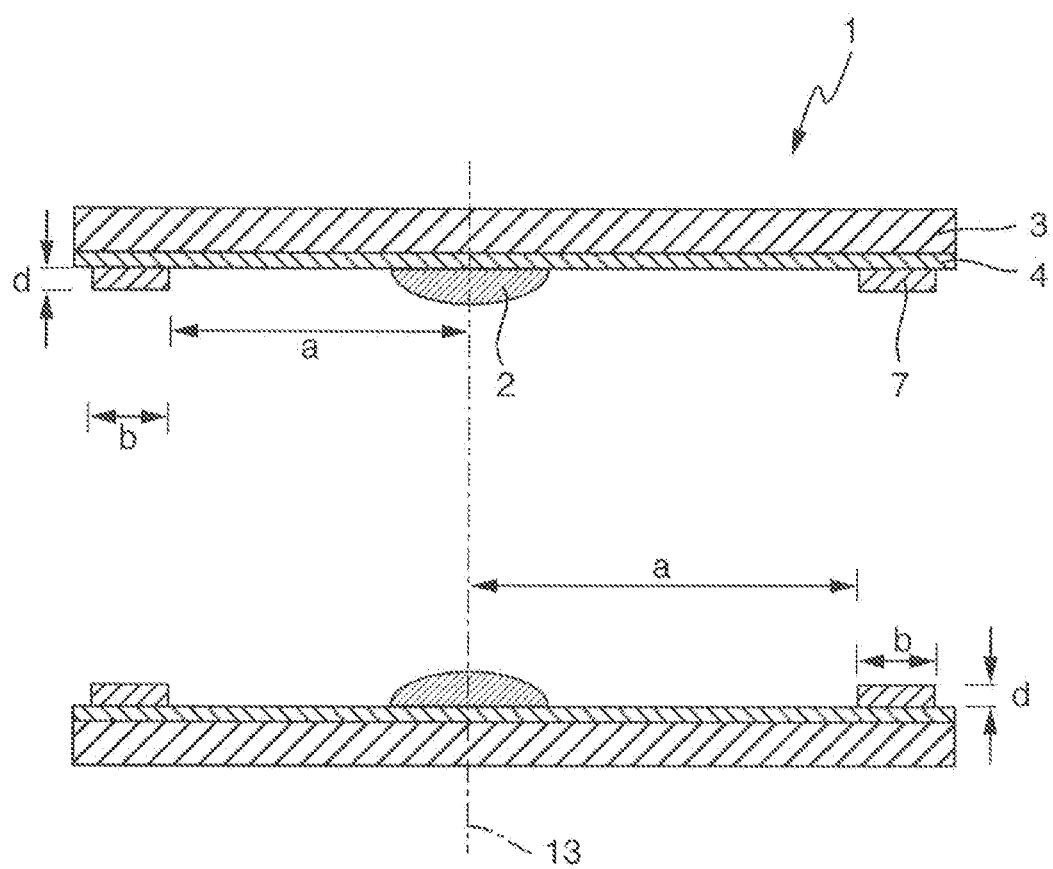
FIG. 7 shows a longitudinal section of a conductive tube with two measuring electrodes, a liner and a ring-shaped grounding electrode with dimensions.

FIG. 7 shows a measuring tube 1 provided with dimensioning of the grounding electrodes 7. A grounding electrode 7 has a layer thickness d, a ring breadth b and a distance a to the tube cross section 13 extending through the centers of the two measuring electrodes 2.

For measuring tubes 1 having a nominal diameter D of at least 300 mm, a ring breadth b of at least 2 cm is advantageous. In this way, it can be assured that the grounding electrode 7 has a sufficient conductivity to discharge charges in the medium.

There are also magnetic-inductive flowmeters with insulating tubes 3, for example, of PET or ceramic. While forms of embodiment of the invention with an insulating tube 3 and a selectively applied, conductive coating 7 are not shown in the figures, they do fall within the scope of the invention.

Advantageously, the surface to be coated is treated before the application of the conductive coating 7, in order to enable improved adhesion. Such can occur chemically by etching or by corona treatment or lasers or by abrasive methods such as e.g. sand blasting.

LIST OF REFERENCE CHARACTERS

1 measuring tube
2 measuring electrodes
3 tube
4 liner
5 magnetic field generating means
6 evaluation unit
7 grounding electrode
8 shield element
9 grounding cable
10 flange
11 rotational axis
12 spray head
13 tube cross section

The invention claimed is:

1. A magnetic-inductive flowmeter, comprising:
a measuring tube adapted for conveying a medium, wherein the measuring tube includes a selectively applied conductive coating on an internal surface of the measuring tube as to enable galvanic contact with the medium; and
a magnetic field generating coil and at least two measuring electrodes configured to sense a measurement voltage generated inductively in the medium,
wherein the conductive coating has a breadth such that:

$$b \geq c \cdot D^2 / l,$$

wherein parameter b is the breadth, parameter l is a length of the measuring tube, and parameter D is a nominal diameter of the measuring tube for which $D \geq DN300$, and
wherein parameter c depends on a configuration of the magnetic field generating coil, having values $0.05 \leq c \leq 0.25$.

2. The flowmeter of claim 1, wherein the conductive coating comprises at least one of a conductive polymer, a metal, a paint, and a powder coating.

3. The flowmeter of claim 1, wherein the conductive coating is configured in a ring shape.

4. The flowmeter of claim 1, wherein the conductive coating is applied selectively at or near an inlet and an outlet of the measuring tube.

5. The flowmeter of claim 1, wherein the conductive coating has a breadth such that:

$$b \geq c \cdot l,$$

wherein the length of the measuring tube is approximately equal to a nominal diameter of the measuring tube.

6. The flowmeter of claim 1, wherein the conductive coating has a conductivity greater than or equal to $10^6$ S/m.

7. The flowmeter of claim 1, wherein the measuring tube comprises a conductive tube having a liner or an insulating coating.

8. The flowmeter of claim 7, wherein the conductive coating is disposed on the liner or the insulating coating.

9. The flowmeter of claim 7, wherein an internal surface of the conductive tube is only partially covered with the liner or the insulating coating, leaving exposed areas of the internal surface, and
wherein the conductive coating is disposed in the exposed areas of the internal surface.

10. The flowmeter of claim 1, wherein the measuring tube comprises an insulating tube, including a glass tube, a ceramic tube or a plastic tube.

11. The flowmeter of claim 1, wherein the measuring tube includes a flange at each end, wherein the conductive coating extends at least partially onto the respective flanges.

12. The flowmeter of claim 1, wherein the conductive coating is electrically grounded via a cable and/or a piece of sheet metal and/or by grounding the conductive tube.

* * * * *